No. 652,660. Patented June 26, 1900.
C. W. BRADLEE.
MEAT ROASTING APPARATUS.
(Application filed Oct. 28, 1899.)

(No Model.) 2 Sheets—Sheet 1.

WITNESSES:

INVENTOR:
Charles W. Bradlee.

No. 652,660. Patented June 26, 1900.
C. W. BRADLEE.
MEAT ROASTING APPARATUS.
(Application filed Oct. 28, 1899.)
(No Model.) 2 Sheets—Sheet 2.

WITNESSES:
Saut Dunker
Charles S Barker

INVENTOR:
Charles W. Bradlee.
by Allan Gudier, his atty.

UNITED STATES PATENT OFFICE.

CHARLES W. BRADLEE, OF BOSTON, MASSACHUSETTS.

MEAT-ROASTING APPARATUS.

SPECIFICATION forming part of Letters Patent No. 652,660, dated June 26, 1900.

Application filed October 28, 1899. Serial No. 735,051. (No model.)

*To all whom it may concern:*

Be it known that I, CHARLES W. BRADLEE, a citizen of the United States, residing at 113 Beacon street, Boston, in the county of Suffolk and State of Massachusetts, have invented new and useful Improvements in Meat-Roasting Apparatus, of which the following is a specification.

This invention relates to improvements in meat-roasting apparatus for the purpose of uniformly roasting meats, game, &c.; and it is carried out as follows, reference being had to the accompanying drawings, wherein—

Figure 1:
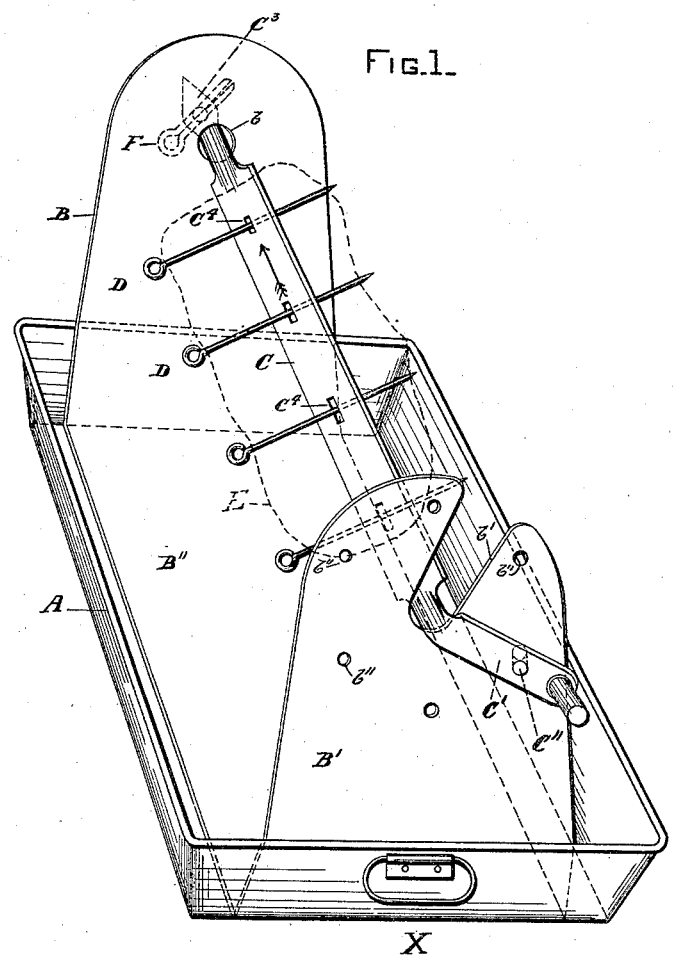
Figure 2:
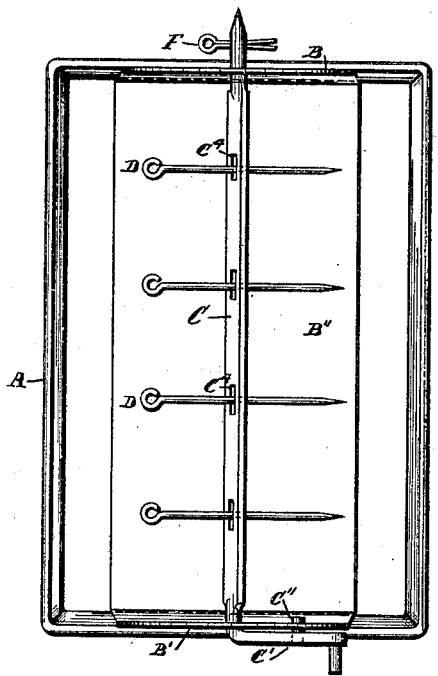
Figure 3:
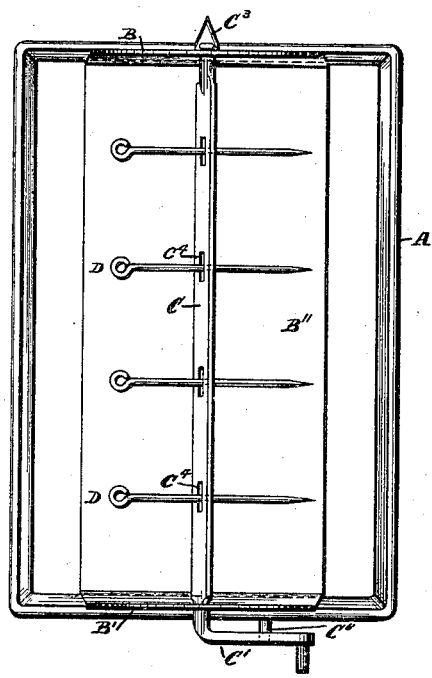
Figure 4:
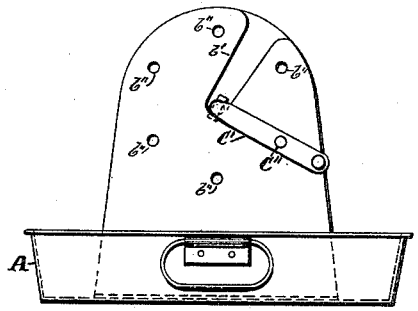

Figure 1 represents a perspective view of the improved apparatus. Fig. 2 represents a top plan view showing the food-holding spit held in locked position relative to its bearings. Fig. 3 represents a similar view showing said spit released and capable of being rotated with the meat, &c., attached to it; and Fig. 4 represents an end view seen from X in Fig. 1.

Similar letters refer to similar parts wherever they occur on the different parts of the drawings.

In the drawings, A represents a roasting-pan of any desired well-known size or shape, within which is preferably located a pair of upwardly-extending brackets B B′, connected at a proper distance apart by means of a base plate or portion B″, preferably supported or resting loosely in the bottom of the pan A, as shown.

C is the spit, to which the meat or food is secured during the roasting operation. Said spit is detachably journaled in the brackets B B′, there being for this purpose, preferably, a perforation $b$ in the bracket B and a slotted recess $b'$ in the bracket B′, as shown in Fig. 1.

To the front end of the spit C is secured or made integral therewith a crank C′, by means of which the spit and food attached to it can be turned from time to time, as may be needed during the roasting operation.

The spit C is made longitudinally adjustable in its bearings for the purpose of enabling it to be temporarily secured in any desired position or released, so as to enable the meat or food to be rotated during the roasting operation.

For the purpose of holding the spit and food held thereon locked in any desired position I prefer to make on the inside of the crank C′ a pin or projection C″, adapted to be interlocked with any one of the perforations $b''$ $b''$ in the bracket B′, as shown in the drawings.

If it is desired to lock the spit in any desired position during the roasting operation, it is only necessary to move it in the direction of the arrow shown in Fig. 1 until the crank pin or projection C″ is caused to interlock with any one of the bracket-perforations $b''$, as shown in Figs. 1 and 2. To release the said spit, so as to permit it and the food to be turned or rotated, it is only necessary to move the spit longitudinally in a direction opposite to that shown by arrow in Fig. 1 sufficiently to cause the crank-pin C″ to be withdrawn from the perforation $b''$, in which it was locked, as shown in Fig. 3, after which the spit may be turned more or less around its axis and again locked into any new position, as may be desired, during the roasting operation.

The end of the spit opposite to its crank end is pointed, as shown at $C^3$ in Figs. 1, 2, and 3, so as to enable the spit to be readily pushed through the meat or food previous to the roasting operation.

The spit C is provided with a series of transverse perforations $C^4$ $C^4$, adapted to receive the skewer-pins D D, which are pushed through the meat or food E, (shown in dotted lines in Fig. 1,) by which arrangement the food is held properly attached to the said spit during the roasting operation.

In practice I prefer to insert a split pin F through the pointed end $C^3$ of the spit outside of the bracket B, so as to prevent such end of the spit from being accidentally detached from said bracket during the roasting operation.

The brackets B B′ are shown in the drawings as being separate and detachable from the roasting-pan A, and this is preferable, as the roasting apparatus may thereby be used in connection with any proper-sized pan for the purpose, and the apparatus may thereby be manufactured and sold separate from the pan; but I wish to state that I do not wish to confine myself to this exact construction, as, if so desired, the said brackets may be permanently secured to the pan without departing from the essence of my invention.

In using the device the locking-pin F is disconnected from the spit C, and said spit is removed from its brackets B B′, after which the said spit is introduced into the meat or food and secured thereto by the skewers D D. The pointed end of the spit is then pushed through the perforation $b$ in the bracket B, and the crank end of said spit is placed in the notch $b'$ in the bracket B′, after which the split pin F is pushed through the perforation in the pointed end of the spit. The pan is then placed in the oven, and the meat upon the spit may then be turned, by means of the crank C′, from time to time, as may be desired, during the roasting operation.

If desired to lock the spit and the food temporarily in position at any time, it is only necessary to move the same longitudinally in the direction of the arrow shown in Fig. 1 until the crank projection C″ is made to interlock with any one of the perforations $b''$ in the bracket B′, as shown in Fig. 2.

Having thus fully described the nature, construction, and operation of my invention, I wish to secure by Letters Patent and claim—

1. The herein-described meat-roasting apparatus adapted to be removably placed in a suitable pan or vessel, comprising a base-plate having vertical brackets at its opposite ends, one of said brackets being provided with an opening and the other with an open slot and a plurality of apertures arranged around said slot in the arc of a circle, a rotary and longitudinally-adjustable spit journaled in said opening and slot, respectively, in the brackets, a crank at one end of the spit, a locking pin or projection carried by said crank and arranged to enter either of the said plurality of apertures in the brackets, and means for securing the meat to be roasted to said spit, substantially as described.

2. The herein-described meat-roasting apparatus adapted to be removably placed in a suitable pan or vessel, comprising a base-plate B″, having its opposite ends bent upward at right angles to provide two vertical brackets B, B′, one of said brackets being provided with an opening $b$, and the other with an open slot $b'$, and a plurality of apertures $b''$, arranged around said slot in the arc of a circle, a rotary and longitudinally-adjustable spit C, journaled in said opening and open slot, respectively, in the brackets, a crank C′ at one end of the spit, a locking-pin C″ carried by the crank and arranged to enter either of the said plurality of apertures in the brackets, and a locking-pin F, removably inserted in an opening in the end of the spit, substantially as described.

In testimony whereof I have hereunto set my hand in presence of two subscribing witnesses.

CHARLES W. BRADLEE.

Witnesses:
ALBAN ANDRÉN,
MARGARET E. DALEY.